(12) United States Patent
G et al.

(10) Patent No.: US 9,989,940 B2
(45) Date of Patent: Jun. 5, 2018

(54) METHOD FOR ENGINEERING A DISTRIBUTED CONTROL SYSTEM AND AN ENGINEERING TOOL THEREOF

(71) Applicant: ABB Technology Ltd., Zürich (CH)

(72) Inventors: Abhilash G, Bangalore (IN);
Rajasekaran D, Bangalore (IN);
Ramesh Bhovi, Karnataka (IN); Sulabh Shrivastava, Chattisgarh (IN); Kapil Methi, Delhi (IN); Jithin Kp, Kozhikode (IN); Biju Pk, Bangalore (IN)

(73) Assignee: ABB SCHWEIZ AG, Baden (CH)

( * ) Notice: Subject to any disclaimer, the term of this patent is extended or adjusted under 35 U.S.C. 154(b) by 790 days.

(21) Appl. No.: 14/498,008

(22) Filed: Sep. 26, 2014

(65) Prior Publication Data
US 2015/0012118 A1 Jan. 8, 2015

Related U.S. Application Data

(63) Continuation of application No. PCT/IB2013/000555, filed on Mar. 29, 2013.

(30) Foreign Application Priority Data

Mar. 30, 2012 (IN) .......................... 1256/CHE/2012

(51) Int. Cl.
*G05B 11/01* (2006.01)
*G05B 15/02* (2006.01)
(Continued)

(52) U.S. Cl.
CPC ......... *G05B 15/02* (2013.01); *G05B 19/0426* (2013.01)

(58) Field of Classification Search
CPC .. G05B 19/056; G05B 19/0426; G05B 15/02; G06F 8/34; G06F 8/35; G06F 17/3043;
(Continued)

(56) References Cited

U.S. PATENT DOCUMENTS 8,060,834 B2 * 11/2011 Lucas ................ G05B 19/0426
715/771
8,060,862 B2 * 11/2011 Eldridge ................ G05B 15/02
700/86
(Continued)

FOREIGN PATENT DOCUMENTS

WO WO 2011/018684 2/2011

OTHER PUBLICATIONS

Van-der-Hoek et al., Decomposing constraint systems: equivalences and computational properties, May 2011, 8 pages.*
(Continued)

*Primary Examiner* — Thuy Dao
(74) *Attorney, Agent, or Firm* — Barnes & Thornburg LLP

(57) ABSTRACT

An exemplary method for engineering a Distributed Control System (DCS) having at least one Input/Output device and at least one controller that are communicatively connected. A user is prompted to request an application type and select a variant from one or more variant options, at least one device is identified from a plurality of devices available in the DCS, selecting at least one function block including function fragments from a library based on the user input, instances of function fragments are created and at least one instance of function fragments is arranged based on the at least one identified device from the plurality of devices and configuring the at least one identified device based on the created instances of function fragments. The selected solution variant option is determined from the arranged function
(Continued)

fragments and changes are made dynamically to satisfy one or more identified DCS conditions.

16 Claims, 1 Drawing Sheet

(51) Int. Cl.
*G05B 15/00* (2006.01)
*G05B 19/042* (2006.01)

(58) Field of Classification Search
CPC ....... G10L 15/30; G10L 15/142; G10L 15/18; G10L 15/183
See application file for complete search history.

(56) References Cited

U.S. PATENT DOCUMENTS

| | | | | |
|---|---|---|---|---|
| 8,458,659 | B2* | 6/2013 | Resnick | G05B 15/02 715/762 |
| 9,417,626 | B2* | 8/2016 | Jones | G05B 19/0426 |
| 9,501,208 | B2* | 11/2016 | Jundt | G06F 3/0484 |
| 9,513,780 | B2* | 12/2016 | Scott | G06F 3/0484 |
| 2009/0282067 | A1* | 11/2009 | Bendigeri | G05B 19/042 |
| 2010/0222899 | A1* | 9/2010 | Blevins | G05B 17/02 700/80 |
| 2011/0191500 | A1* | 8/2011 | Odayappan | G05B 19/0426 710/8 |
| 2012/0239170 | A1 | 9/2012 | Kulathu et al. | |
| 2014/0257529 | A1* | 9/2014 | Dicaire | G05B 15/02 700/79 |

OTHER PUBLICATIONS

Oriol et al., FASA: a scalable software framework for distributed control systems, Jun. 2012, 10 pages.*
Chapman et al., Software architecture definition for on-demand cloud provisioning, Jun. 2010, 12 pages.*
International Search Report (PCT/ISA/210) dated Aug. 12, 2013, by the IB Patent Office as the International Searching Authority for International Application No. PCT/IB2013/000555.
Written Opinion (PCT/ISA/237) dated Aug. 12, 2013, by the IB Patent Office as the International Searching Authority for International Application No. PCT/IB2013/000555.
Feng et al., "A framework-based approach to control system engineering following IEC61499", vol. 2, Nov. 2, 2004, pp. 1918-1923.
Rooker et al., "Reconfigurable control in distributed automation system", Jun. 22, 2009, pp. 705-714.

* cited by examiner

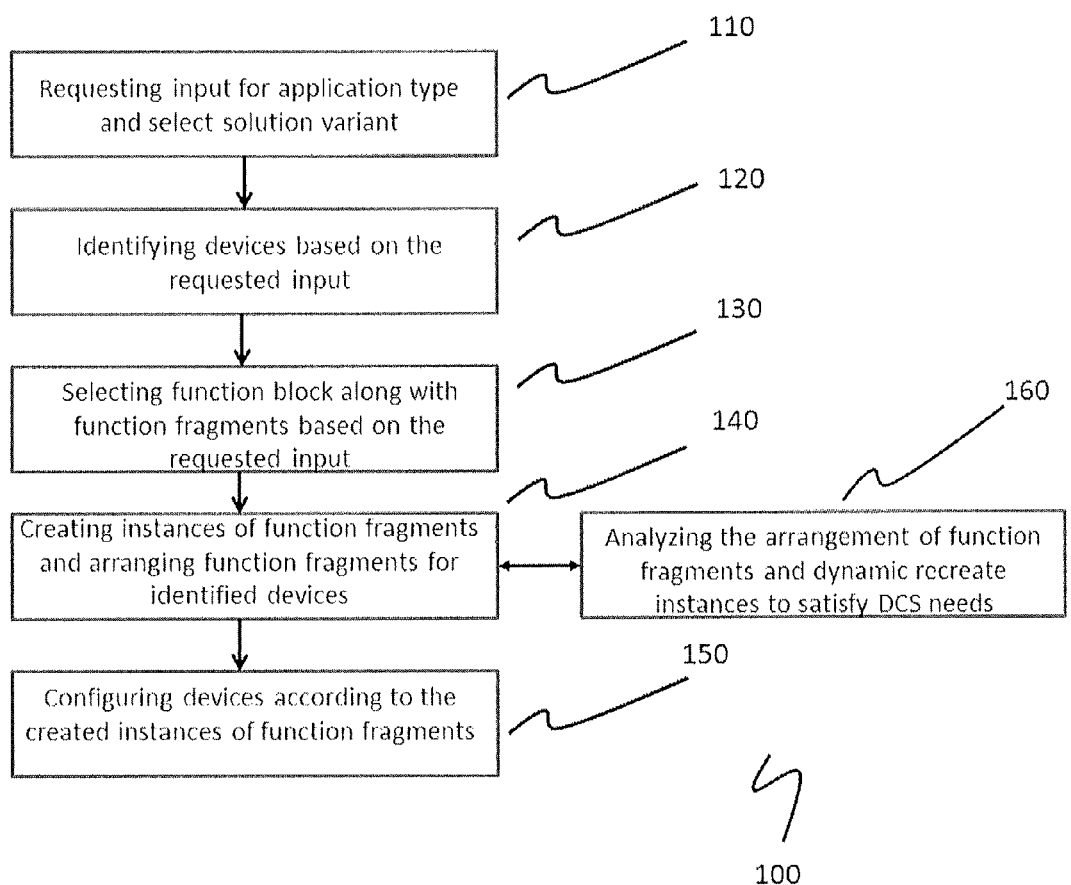

US 9,989,940 B2

METHOD FOR ENGINEERING A DISTRIBUTED CONTROL SYSTEM AND AN ENGINEERING TOOL THEREOF

RELATED APPLICATION(S)

This application a continuation of International application PCT/IB2013/000555 filed on Mar. 29, 2013, designating the U.S., and claiming priority to Indian application 1256/CHE/2012 filed in Europe on Mar. 30, 2012. The entire content of each prior application is hereby incorporated by reference.

FIELD

The present disclosure relates to Distributed Control Systems and more particularly, a method for engineering a Distributed Control System.

BACKGROUND INFORMATION

Distributed Control System (hereinafter DCS) are used to control process plants and play an important role in achieving automation within the plant. The control and automation functions for the process plant are achieved by engineering these control and automation functions through the various devices of the DCS.

A method of engineering is usually based on a standard, example IEC 61499 (International Electrotechnical Commission) that specifies a system model that includes a device model, a resource model and an application model for configuring the system. The device model provides for representing devices, process interfaces, communication interfaces and also data flow for an event. Various actions can be performed on resources in the DCS. For example, the resources may be configured, parameterized, started up, deleted, and acted on through other suitable actions as desired. The resource model provides for scheduling the functions that are provided with function block specifications. The application model provides for high level application and sub-application builds and behaviour. An application may be distributed among several resources in the same or different devices.

A known engineering process includes (e.g., comprises) step of analysing inputs, building a function block network based on the inputs, connecting function blocks, and creating applications based on preset devices/controllers. The inputs can be received in the form of piping and instrumentation (P&I) diagrams, Input/Output (I/O) point description and some additional user inputs.

Each device/controller type can include a library which contains the types of Function blocks which can be used by the controller. The library can also include controller types that come with certain description of their capabilities, such as the interfaces they support for communication. These controller type libraries are provided (e.g., appear) in the engineering station toolbox. The engineer can drag or drop the function or application types into the function designers by following guidelines, which can include, for example:

1. Physical location of the field inputs and outputs and the wiring/cabling conditions.
2. Load the control logic and check at runtime the CPU utilization.
3. Communication logic configured as standard interface (Communication) blocks, connected to control logic, and shown as data or events over the control networks.
4. The number of I/Os and I/O types decide the allocations, and controllers can have access to limited I/Os or I/Os are directly attached to the controllers.
5. The engineers can select the controller types which will do the job with I/O information.

These applications are attached with timing constraints and an execution sequence is defined and downloaded to the devices so that they operate in the defined execution sequence.

In modern devices, intelligence can be included in various features of the system, such as sensors, I/Os, Controllers (Communication Interfaces or Control modules) and a Human Machine Interface (running party Real-time parts and non-real time parts), thereby creating a system that is capable of dynamic computing.

In a modern system, all data can be available on a single bus (or able to be brought to single bus via proxies and/or gateways) and the devices can be connected dynamically.

In order to exploit the capabilities of known devices and make the best of new technologies coming with newer devices having programmable intelligence and abilities for dynamic connections, there is a need for a more dynamic method for balanced application distribution across the devices in the control system.

In known systems, proximity considerations can no longer be an acceptable constraint because the wired broadband/wireless networks provide an ability to talk across long distances. Availability of all data on one bus means we can take various decisions based on the data as well as respond to the data across in a more distributed manner as well more locally. In order to efficiently distribute the data and also provide data cooperation and/or communication among the devices, the soft-marshalling/soft wiring and re-wiring on the fly should be dynamic.

SUMMARY

An exemplary method for engineering a Distributed Control System having a plurality of devices including at least one Input/Output device and at least one controller device that have a communicative connection is, the method comprising the steps of:

a. Prompting a user to request an application type and select a solution variant from one or more solution variant options;

b. Identifying at least one device from the plurality of devices based on the user input;

c. Selecting at least one function block along with its function fragments from a plurality of function blocks available in a library based on the requested application type and selected solution variant;

d. Creating instances of function fragments and arranging at least one instance of function fragments based on the at least one identified device; and e. Configuring the at least one identified device based on the created instances of function fragments, wherein, creating instances of function fragments and arranging at least one instance of function fragments based on the at least one identified device includes a step of analysing the arrangement of instances of function fragments for the selected solution variant option for the at least one identified device to find solutions that satisfy one or more identified distributed control system conditions.

An exemplary controller for generating an engineering tool of a distributed control system is disclosed, the processor being configured with program code which when executed generates the engineering tool comprising: a library of function blocks along with its function fragments; a library of devices and communication types used in the distributed control system; a module for creating function fragments for at least one device used in the distributed control system; and a module for analysing instances of function fragments for at least one device used in the distributed control system.

An exemplary method for engineering a Distributed Control System having a plurality of devices including at least one Input/Output device and at least one controller device that have a communicative connection is, the method comprising the steps of:

a. requesting a user to input an application type and to select a solution variant from one or more solution variant options;
 b. identifying at least one device from the plurality of devices based on the user input;
 c. selecting at least one function block along with its function fragments from a plurality of function blocks available in a library based on the requested application type and selected solution variant;
 d. creating instances of function fragments and arranging at least one instance of the function fragments based on the identified at least one device from the plurality of devices;
 e. analyzing the arrangement of the at least one instance of function fragments for the selected solution variant option for the identified at least one device;
 f. dynamically rearranging one or more instances of function fragments to one or more devices of the plurality of devices based on the analysis of the arrangement of the at least one instance of function fragments to find a rearrangement of instances of function fragments that satisfies one or more identified distributed control system needs; and
 g. configuring the one or more devices based on the rearrangement of instances of function fragments.

BRIEF DESCRIPTION OF THE DRAWINGS

For a full and more complete understanding of the claimed invention, reference is herein made to the following FIGURE:

FIG. 1 shows a block diagram of the method of engineering, in accordance with an exemplary embodiment of the present disclosure.

DETAILED DESCRIPTION

Exemplary embodiments of the present disclosure are directed to a method for engineering a DCS. The DCS has plurality of devices including (e.g., comprising) at least one Input/Output (I/O) device and at least one controller device that is connected over the DCS network such that an I/O device can communicate with at least one controller device. In a modern DCS any I/O device can communicate with any controller device and the process control/supervision activity associated with a controller can be performed by either of the controller or the I/O device.

The Input/Output and controller devices can include a processor, such as any known general purpose processor or integrated circuit such as a central processing unit (CPU), microprocessor, field programmable gate array (FPGA), Application Specific Integrated Circuit (ASIC), or other suitable programmable processing or computing device or circuit as desired. The processor can be configured with program code, which when executed causes the processor to generate an engineering tool and perform process control/supervision activity according to exemplary embodiments of the present disclosure. The program code can be encoded or recorded on the processor, or stored in a non-volatile memory device, such as Read-Only Memory (ROM), erasable programmable read-only memory (EPROM), or other suitable memory device or circuit as desired. In an exemplary embodiment, the program code can be recorded on a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor for execution as desired, when the computer readable medium is placed in communicable contact with the processor of the Input/Output and controller devices.

The method includes requesting a user to input an application type and to select a solution variant from one or more solution variant options available in the engineering tool library for the requested application type. Based on the user input, at least one device from the plurality of available devices in the DCS can be identified for configuration. Also, corresponding function blocks for the requested application type and solution variant are identified.

The function blocks can include a plurality of function fragments that are linked together. The function fragments can be configured in one or multiple devices. The instances of function fragments can be created in the engineering tool and arranged based on the at least one identified device, such as an I/O device, for example. The creation of the instances includes analysing the function fragments based on the involved device specifications and/or processing and communication overheads so that the overall functionality may be ascertained according to the DCS (processes, device or interaction) specifications. The created instances and the suitable arrangement as per the analysis are used to configure the devices with the engineering tool. The engineering tool during analysis can dynamically rearrange the initially created instance of function fragment to satisfy one or more identified distributed control system conditions (e.g., needs).

Further, the analyzed options involving function fragments for various solution variant options, devices, or algorithm types (with algorithm step number) can be reported to gather user input to find the solution that is suitable for configuration. The engineering tool can also automatically select the most suitable combination of function fragment and devices for configuration.

In another exemplary embodiment of the present disclosure, the engineering tool can include the specified libraries of function blocks with algorithm types and algorithm step number and specifications associated with device type and communication block type used in the DCS. Further, the engineering tool has a module for creating function fragments for devices in the DCS and a module for analysing instances of function fragments for devices used in the DCS. The engineering tool configures the devices using the created instances of function fragments.

The following description with reference to the accompanying drawings is provided to assist in a comprehensive understanding of exemplary embodiments disclosed herein.

According to an exemplary embodiment of the present disclosure, an engineering tool used for engineering DCS accepts inputs including Process & Instrumentation (P&I) Diagrams, I/O Points Descriptions and user inputs to engineer a DCS based on the said inputs, using a function block network. The engineering tool includes device/control libraries that contain information about device type, function block type and communication block types.

The exemplary embodiments provide a method of engineering DCS that support dynamic capabilities. The engineering tool also includes device/control libraries, which store new attributes defining algorithm type (associated to processing), such as PI or PID and algorithm step number (an execution sequence step based on architecture input). The algorithm step number could differ based on the algorithm type, if there are multiple algorithm types available as an option.

FIG. 1 shows a block diagram of the method of engineering, in accordance with an exemplary embodiment of the present disclosure. As shown in FIG. 1, the method includes the steps of requesting the user to input an application type and select a solution variant from one or more solution variant options [110], identifying at least one device from a plurality of devices available for engineering the DCS based on the user input [120], selecting at least one function block along with associated function fragments from the plurality of function blocks available in the engineering tool library based on the said user input [130], creating instances of function fragments and arranging at least one instance of function fragments based on the identified at least one device from the plurality of devices [140], and configuring the identified at least one device from the plurality of devices based on the created instances of function fragments [150].

The step of creating instances of function fragments and arrangement of function fragments and associating or to designating a function fragment with a specified device in the DCS is carried out after analyzing the arrangement of instances of function fragments for the selected solution variant option and the associated/available devices. The instances of function fragments are created such that the arrangement satisfies an engineering specification associated with an operation of the associated device, the specifications of the engineering process, or the specifications of the DCS [160]. Such specifications are referred hereafter in the present disclosure as "distributed control system conditions".

The analysis also includes a trail of options available within the DCS engineering tool by the engineering tool to try out available devices with various combinations of function blocks fragment arrangements, algorithms (based on algorithm type and algorithm step number associated with available function blocks) or solution variants to satisfy the distributed control system conditions in the most suitable manner. The tool also suggests available options for engineering with best use of resources available in the DCS. User inputs may be taken for the same to confirm a particular option for configuration of devices based on the analyzed (created) instances of function fragments.

Thus the engineering tool provides a dynamic distribution of function fragments that can be different from the initial selection of a function fragment, based on the trial analysis to find most suitable function fragment for a selected/available device and the combination of a function fragment and selected/available device which works best as a system to meet the DCS conditions.

The following example is representative of an exemplary implementation of an exemplary embodiment of the present disclosure with respect to boiler control.

During configuration, the engineering tool requests a user to specify an Application Type. The user can select an application type, such as boiler protection, for example. The tool can request the user to select from multiple solution variants, such as Solution Variant 1 or Solution Variant 2, for example, where the solution variants include the following information:

a. Time Synchronization Scheme
 i. Source Device Type=Controller and Precision=1 ms
 ii. Time Synch communication mechanism and Protocol scheme=SNMP
b. Communication and Decision Scheme
 i. Voting Protocol scheme=ALP(Proprietary Protocol) for decision making
 ii. Decision Maker and Participants scheme (2 out of 3 Voting) Redundancy following PRP standards
 iii. Capacity of Plant greater than 210 MW and less than 1000 MW
c. Alarm Scheme
 i. Definition of communication path for propagation of alarms and Protocol scheme=EEMUA 191 standards based HMI oriented
 ii. Precision description=Sequence of events maintain 1 ms for process and 1 microsecond for power system events For the Boiler Protection application type, the following solution variants may be considered as exemplary cases.

Solution Variant 1
a. Time Synchronization Scheme
 i. Source Device Type=Controller and Precision=1 ms
 ii. Time Synch communication mechanism and Protocol scheme=SNMP
b. Communication and Decision Scheme
 i. Voting Protocol scheme=ALP(Proprietary Protocol) for decision making
 ii. Decision Maker and Participants scheme (2 out of 3 Voting) Redundancy following PRP standards
 iii. Capacity of Plant greater than 210 MW and less than 1000 MW
c. Alarm Scheme
 i. Definition of communication path for propagation of alarms and Protocol scheme=EEMUA 191 standards based HMI oriented
 ii. Precision description=Sequence of events maintain 1 ms for process and 1 microsecond for power system events Solution Variant 2
a. Time Synchronization Scheme
 i. Source Device Type=External Time Source and Precision=1 microsecond
 ii. Time Synch communication mechanism and Protocol scheme=PTP1588
b. Communication and Decision Scheme
 i. Voting Protocol scheme (2 out of 3 Voting) for decision making
 ii. Decision Maker and Participants scheme (Decision based on voting or Hybrid Quick/Prediction based decision support) and Redundancy based on HSR scheme
c. Alarm Scheme
 i. Definition of communication path=Inclusive of all linked networks (including field and controllers) for propagation of alarms and Protocol scheme=based on SysLog and more over Ethernet and also across wireless links
 ii. Precision description=1 microsecond across process and power system events The user can select a solution from the above two options. In one example, the user can select Solution Variant 1 to complete first step 210 in the engineering tool.

The tool can then identify the devices supporting based on interfaces. For example, the tool can determine that interfaces for SNTP are present in the Controller 1 (a variant in Controller type). Controller 1 is selected by filtering the available variants in Controller type. If I/O is an intelligent I/O then I/O Handling could be on the I/O. As the time synchronization precision is in milliseconds, the Time Synch function in the Controller library is added. Based on predetermined system safety (Safety integrity Level standard) levels the suitable interface and device are selected.

Interfaces can include external and internal interfaces, such as a CPU=processor interface, Ethernet card=communication interface. Support for a specific protocol (e.g., SNTP) provides full interface support for the protocol. These are available based on device type information.

Based on a functional organization of the process, the engineering tool browses through the libraries to select function blocks that are available as groups of function fragments or logic gate elements. The function blocks can include:

Time Synchronization Block
Function Blocks for I/O Handling based on interface type
Function Blocks responsible for peer-to-peer communication
Function Blocks responsible for HMI interaction
Pre-processing Function Blocks
Basic Logical Function Blocks
Function Blocks responsible for decision or main functions The above function blocks can further include:
Time Synch Block: Extended Executive (EXEXEC) Function Block used with time synchronization and cycle time settings for function blocks.
Function Blocks related to I/O.
Pulse Input/Period (PIPER) function Blocks, Analog Input Slave (AIS/FBS—Field Bus Slave).
Human Machine Interface (HMI) Related Function Blocks.
Analog Exception Report Function Blocks (AO/L).
Sequence of Events Slave (SOE/S)—Ability for 32 digital inputs, timestamp the inputs based on a specified precision as used for identifying the alarms and events and their sequence.
Basic Function Blocks could include the AND Blocks, RCM—Remote Control Memory Blocks.
Function Blocks related to Decision Making and Execution.
Multistate Device Driver (MSDVDR) is capable of governing motor, and has four state controls with feedback.
Proportional, Integral and Derivative (PID) Error is capable of providing actions on error signal from process variable and set point inputs.

The system creates instances of function or logical blocks in the engineering system. Within the grouping from selection of function blocks or logic gate elements as described above, the function block or logic instances are arranged from input to output based on the algorithm step attributes defined in the library. These groups are considered as initial fragments available offline in the engineering tool.

For example, the fragments can include:
Fragment1: Input Blocks and Time Synch Block included.
Fragment2: Analog Exception Report and Sequence of Event Slave together.
Fragment3: Decision blocks PID Error and MSDVDR—Multistate Device Driver capable of controlling field equipment.

The engineering tool performs a forward chaining analysis to determine how the solution variant definitions and the arrangement of instances of function or logical blocks satisfy these criteria. The forward chaining analysis can be executed as follows:

a. The engineering tool detects the start time and from the input to the output of Time Synchronization fragment, and analyzes the execution sequence and checks for the time that it takes for the execution.

b. Considering that the fragments will go into multiple devices seeing virtual device boxes and considering a factor of communication overhead of 20%, the execution times are compared with the total reaction times of the Boiler Protection solution being <20 ms.

c. All the fragment blocks are checked whether they have input from the time synchronization fragment and cycle times are so that timestamp the alarms and events generated as output from these can maintain a 1 ms precision.

d. The analysis continues iteratively until the conditions of the solution criteria are satisfied.

e. The result of the analysis can result in:
   i. A suggested modification in existing sequence numbers to match the criteria.
   ii. A suggested reorganization of function blocks, where at least one fragment is moved from one function block to another.

The engineering tool can prompt the user can to select one of the solutions or the engineering tool may automatically select the first solution which satisfies the criteria.

This analysis as described in the above example, can lead to modifications in the execution sequence numbers of the associated functions or logic. In an exemplary embodiment, the analysis can also determine that some logic or functions are better suited in another function network which is connected using communication logic. After analysis of these multiple paths; the engineering tool can arrive at a suitable path of function block network and organization of fragments.

The engineering tool then creates communication function or logic instances to connect the fragments residing on multiple devices together. These blocks therefore are added to the fragment inputs and outputs. As a result, each fragment includes a defined input and output or result. Once the communication blocks are organized, at least one more iteration of forward chaining with respect to the newer blocks can be performed.

As each fragment has its own input and output points, the engineering tool can break down the expected result and the expected breakup for each fragment, which together satisfy the expected criteria to even the load across devices and align to processing interfaces. For example to achieve 20 ms total reaction times, Fragment1 could be configured to act in 10 ms, Fragment 2 in another 5 ms, Fragment 3 in 10 ms and considering some communication load additional (5 ms). Based on this breakdown, each fragment is analyzed based on whether it satisfies the breakup and can therefore work with the processing interface capabilities. For example, a device type can have a higher processing power such that the bigger fragment (e.g., Fragment 1) can be associated therewith.

It should be understood that fragments such as the Analog Exception Report can be provided in I/Os with a defined capability, and Sequence of Events could be defined elsewhere and so on. The fragment PID Error can be handled closer to I/Os.

While only certain features of the invention have been illustrated and described herein, many modifications and changes will occur to those skilled in the art. Thus, it will be appreciated by those skilled in the art that the present invention can be embodied in other specific forms without departing from the spirit or essential characteristics thereof. The presently disclosed embodiments are therefore considered in all respects to be illustrative and not restricted. It is, therefore, to be understood that the appended claims are intended to cover all such modifications and changes as fall within the true spirit of the invention.

What is claimed is:

1. A method for engineering a Distributed Control System having a plurality of devices including at least one Input/Output device and at least one controller device such that the at least one Input/Output device and the at least one controller device have a communicative connection, the method comprising the steps of:
   a. Prompting a user to request an application type and select a solution variant from one or more solution variant options;
   b. Identifying at least one device from the plurality of devices based on the user input;
   c. Selecting at least one function block along with its function fragments from a plurality of function blocks available in a library based on the requested application type and selected solution variant;
   d. Creating instances of function fragments and arranging at least one instance of function fragments based on the at least one identified device; and
   e. Configuring the at least one identified device based on the created instances of function fragments,
   wherein, creating instances of function fragments and arranging at least one instance of function fragments based on the at least one identified device includes a step of analysing the arrangement of instances of function fragments for the selected solution variant option for the at least one identified device to find solutions that satisfy one or more identified distributed control system conditions.

2. The method as claimed in claim 1, wherein the step of analysing the arrangement of instances of function fragments for the selected solution variant option, and the at least one identified device to find a solution that satisfies one or more identified distributed control system conditions, further includes the step of dynamically rearranging at least one instance of function fragments in any of the plurality of devices to identify the solution that satisfies one or more identified distributed control system conditions.

3. The method as claimed in claim 1, wherein the step of analysing the arrangement of instances of function fragments for the selected solution variant option, and the at least one identified device to find a solution that satisfies one or more identified distributed control system conditions, further includes the step of reporting analysis results to gather user input to find the solution that satisfies one or more identified distributed control system conditions.

4. The method as claimed in claim 3, wherein the step of reporting the analysis results to gather user input includes reselecting a solution variant from the one or more solution variant options.

5. The method as claimed in claim 4, wherein the step of reporting the analysis results to gather user input includes reselecting the at least one function block along with its function fragments based on the reselected solution variant.

6. The method as claimed in claim 3, wherein the step of reporting the analysis results to gather user input includes reselecting the at least one function block along with its function fragments based on the reselected solution variant.

7. The method as claimed in claim 1, wherein the step of selecting at least one function block along with its function fragment from the plurality of available function blocks in the library based on the requested application type and selected solution variant further includes selection of the at least one function block along with its function fragment based on algorithm type and algorithm step number associated with the plurality of available function block.

8. The method as claimed in claim 7, wherein the step of selecting the at least one function block along with its function fragment based on algorithm type and algorithm step number associated with the plurality of available function blocks is performed by the engineering tool to find a suitable function block along with its function fragment to satisfy the one or more identified distributed control system conditions.

9. A method for engineering a Distributed Control System having a plurality of devices including at least one Input/Output device and at least one controller device such that the at least one Input/Output device and the at least one controller device have a communicative connection, the method comprising the steps of:
   a. requesting a user to input an application type and to select a solution variant from one or more solution variant options;
   b. identifying at least one device from the plurality of devices based on the user input;
   c. selecting at least one function block along with its function fragments from a plurality of function blocks available in a library based on the requested application type and selected solution variant;
   d. creating instances of function fragments and arranging at least one instance of the function fragments based on the identified at least one device from the plurality of devices;
   e. analyzing the arrangement of the at least one instance of function fragments for the selected solution variant option for the identified at least one device;
   f. dynamically rearranging one or more instances of function fragments to one or more devices of the plurality of devices based on the analysis of the arrangement of the at least one instance of function fragments to find a rearrangement of instances of function fragments that satisfies one or more identified distributed control system needs; and
   g. configuring the one or more devices based on the rearrangement of instances of function fragments.

10. The method as claimed in claim 9, wherein the step of analysing the arrangement of instances of function fragments for the selected solution variant option, and the at least one identified device to find a solution that satisfies one or more identified distributed control system conditions, further includes the step of dynamically rearranging at least one instance of function fragments in any of the plurality of devices to identify the solution that satisfies one or more identified distributed control system conditions.

11. The method as claimed in claim 9, wherein the step of analysing the arrangement of instances of function fragments for the selected solution variant option, and the at least one identified device to find a solution that satisfies one or more identified distributed control system conditions, further includes the step of reporting analysis results to gather user input to find the solution that satisfies one or more identified distributed control system conditions.

12. The method as claimed in claim 11, wherein the step of reporting the analysis results to gather user input includes reselecting a solution variant from the one or more solution variant options.

13. The method as claimed in claim 12, wherein the step of reporting the analysis results to gather user input includes reselecting the at least one function block along with its function fragments based on the reselected solution variant.

14. The method as claimed in claim 11, wherein the step of reporting the analysis results to gather user input includes reselecting the at least one function block along with its function fragments based on the reselected solution variant.

15. The method as claimed in claim 9, wherein the step of selecting at least one function block along with its function fragment from the plurality of available function blocks in the library based on the requested application type and selected solution variant further includes selection of the at least one function block along with its function fragment based on algorithm type and algorithm step number associated with the plurality of available function block.

16. The method as claimed in claim 15, wherein the step of selecting the at least one function block along with its function fragment based on algorithm type and algorithm step number associated with the plurality of available function blocks is performed by the engineering tool to find a suitable function block along with its function fragment to satisfy the one or more identified distributed control system conditions.

\* \* \* \* \*